No. 618,748. Patented Jan. 31, 1899.
W. G. STINCHCOMB & J. STREITZ.
ICE TONGS.
(Application filed Aug. 16, 1898.)
(No Model.)
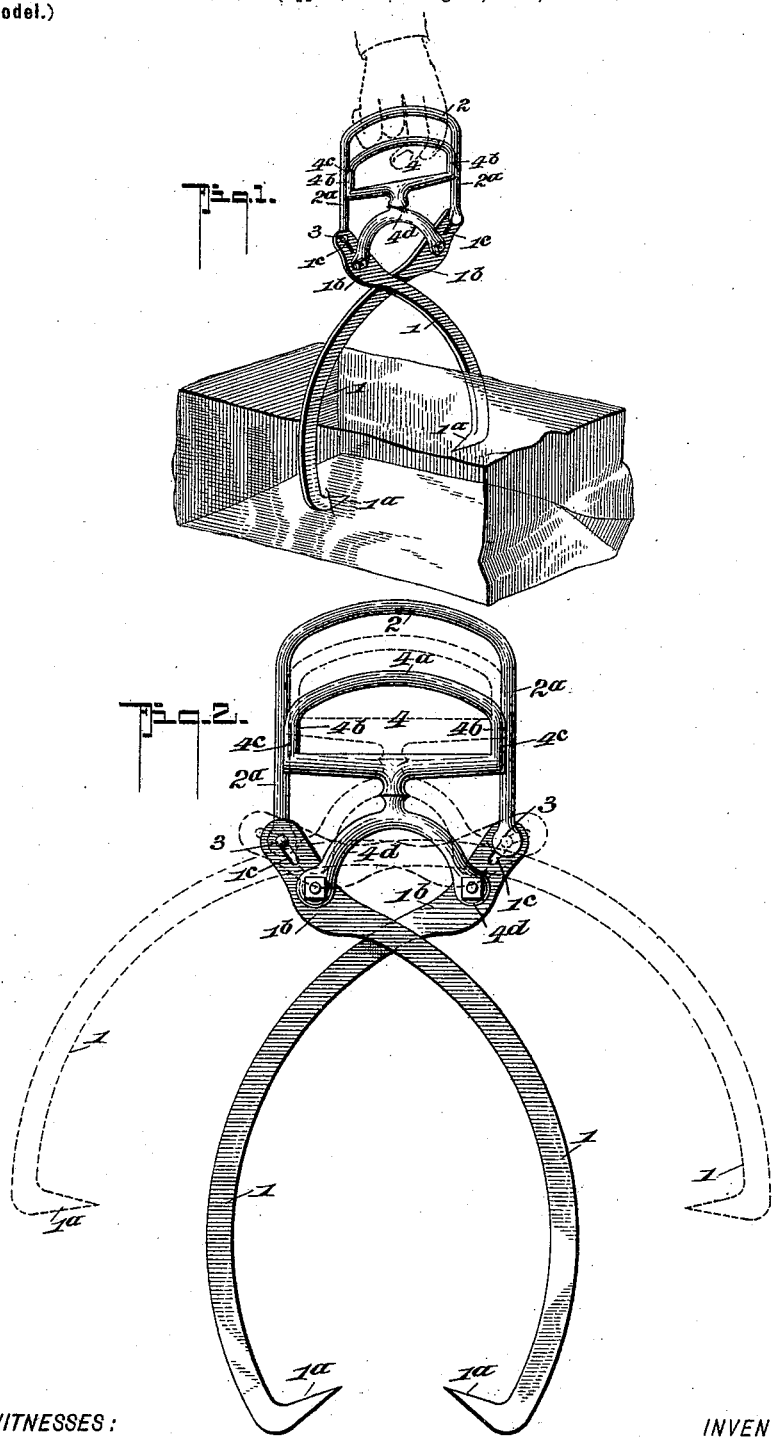
WITNESSES:
INVENTORS
W. G. Stinchcomb
J. Streitz
BY
Fred G. Dieterich & Co.
ATTORNEYS

UNITED STATES PATENT OFFICE.

WALTER G. STINCHCOMB AND JACOB STREITZ, OF MARINE CITY, MICHIGAN; SAID STINCHCOMB ASSIGNOR TO SAID STREITZ.

ICE-TONGS.

SPECIFICATION forming part of Letters Patent No. 618,748, dated January 31, 1899.

Application filed August 16, 1898. Serial No. 688,714. (No model.)

*To all whom it may concern:*

Be it known that we, WALTER G. STINCHCOMB and JACOB STREITZ, residing at Marine City, in the county of St. Clair and State of Michigan, have invented a new and Improved Ice-Tongs, of which the following is a specification.

Our invention comprehends certain improvements in ice-tongs (grapples) comprehending a novel construction of parts whereby to adapt the tongs for convenient manipulation, whereby the user can open or close the tongs and cast the ice or other article grappled in any direction desired with the use of one hand only.

The invention consists in the peculiar construction and combination of parts, such as will be first described in detail and then be specifically pointed out in the appended claims, reference being had to the accompanying drawings, in which—

Figure 1 is a perspective view of our improvement as in use. Fig. 2 is a side elevation thereof, the tongs or jaws being shown closed in full lines and opened in dotted lines.

In its practical construction our improved ice-tongs consist of a pair of tines or jaws 1, having the usual inturned spurs or hooks $1^a$ at their lower end. The jaws 1 differ from the ordinary ice-tong jaws in that they have no pivotal connection with each other. Their upper ends are, however, so formed as to cross each other like the jaws of the ordinary ice-tongs. The upper ends $1^b$ of the jaws 1 have longitudinally-extending elongated slots $1^c$, which engage with the stud-bolts 3 on the ends of the side bars $2^a$ of the main handle 2.

The handle 2 consists of a strong ∩-shaped member, the pendent side bars $2^a$ of which are arranged parallel and form guides for a supplemental handle 4, having a handhold $4^a$, also of ∩ shape, the end members $4^b$ of which have grooves $4^c$, which engage and slide on the bars $2^a$. The handle member 4 has a bifurcated hanger portion $4^d$, the ends of which have pivotal connections with the crossed ends of the jaws 1 at a point below their longitudinal slots, the purpose of which will presently appear.

By providing ice-tongs having their parts arranged and combined in the manner described and shown it is manifest the opening of the jaws can be readily and quickly effected by the user with one or more fingers of the hand holding the tongs pulling the supplemental handle upward, which owing to its points of attachment to the jaws 1 will force such jaws apart, as indicated in dotted lines in Fig. 2, it being obvious that the said supplemental handle will be properly guided in its vertical movement by reason of its engagement with the side bars $2^a$. When the jaws are moved to engage the ice block or other article being grappled, the pivotal points of connection between the jaws and the supplemental handle form the fulcrum-points of the jaws 1, which by reason of the slots in their ends can be swung closely together or expanded without binding on the stud-bolts engaging said slots.

Our form of ice-tongs is of a very simple character, and by reason of providing a sliding handle member having positive support and movement on the main handle portion the user can easily swing the ice block or other article grappled and throw it by the use of one hand only.

Having thus described our invention, what we claim, and desire to secure by Letters Patent, is—

1. A grapple, comprising a handle having parallel pendent members, crossed jaws having slidable pivotal connections with the said pendent members, and a supplemental handle slidable on the main handle having bifurcated arms, pivotally connected to the jaws, substantially as shown and described.

2. An ice-tongs, comprising a ∩-shaped handle; a pair of crossed jaws, the upper ends of which have a slidable pivotal connection with the ends; and a supplemental handle having pivotal connection with the jaws at points inside their pivotal connection with the ∩-shaped handle, as set forth.

3. An improved tongs, comprising in combination; a ∩-shaped handle having stud-bolts at the ends of its side bars; grip-jaws having their upper ends crossed but freely movable on each other, the upper extremities of such ends having elongated longitudinal slots engaging the handle stud-bolts; and the supplemental handle having end portions grooved and held to engage and slide on the side bars of the main handle, said supplemental handle having bifurcated pendent members, pivotally joined to the grip-jaws at points below their connection with the main handle, all being arranged substantially as shown and for the purposes described.

WALTER G. STINCHCOMB.
  JACOB STREITZ.

Witnesses:
 MARY A. JAMESON,
 EDWARD S. JAMESON.